United States Patent [19]

Kabacoff

[11] Patent Number: 4,996,692
[45] Date of Patent: Feb. 26, 1991

[54] LASER COMMUNICATION SYSTEM WITH WIDE BAND MAGNETOSTRICTIVE MODULATION

[75] Inventor: Lawrence T. Kabacoff, Columbia, Md.

[73] Assignee: The United States of America as represented by the Secretary of the Navy, Washington, D.C.

[21] Appl. No.: 408,337

[22] Filed: Sep. 15, 1989

[51] Int. Cl.⁵ .................................................. H01S 3/10
[52] U.S. Cl. ..................................... 372/26; 350/96.29
[58] Field of Search .................... 372/6, 26; 350/96.29, 350/96.30

[56] References Cited

U.S. PATENT DOCUMENTS

| | | | |
|---|---|---|---|
| 3,166,673 | 1/1965 | Vickery et al. | 250/199 |
| 4,068,191 | 1/1978 | Zemon et al. | 372/6 |
| 4,433,291 | 2/1984 | Yariv et al. | 324/244 |
| 4,555,703 | 11/1985 | Cantrell | 343/55 A |
| 4,650,281 | 3/1987 | Jaeger et al. | 350/96.29 |
| 4,763,030 | 8/1988 | Clark et al. | 310/26 |
| 4,830,451 | 5/1989 | Stone | 350/96.29 |

Primary Examiner—William L. Sikes
Assistant Examiner—Robert E. Wise
Attorney, Agent, or Firm—Kenneth E. Walden; Jacob Shuster

[57] ABSTRACT

A laser beam conducted through an optical fiber cable is phase modulated for communication purposes by a signal encoder operative through a source of current to generate a modulated magnetic field applied to a magnetostrictive sheathing. The magnetostrictive sheathing is annealed and covers a portion of the fiber cable which undergoes dimensional change to effect modulation.

12 Claims, 1 Drawing Sheet

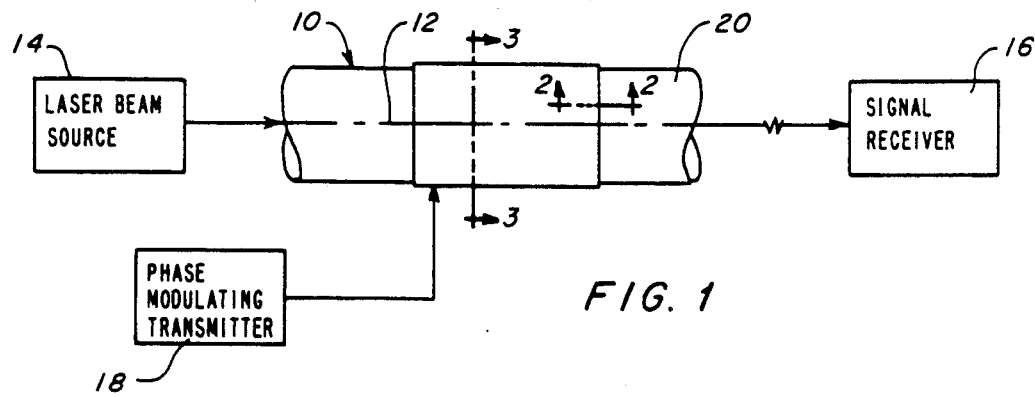
FIG. 1
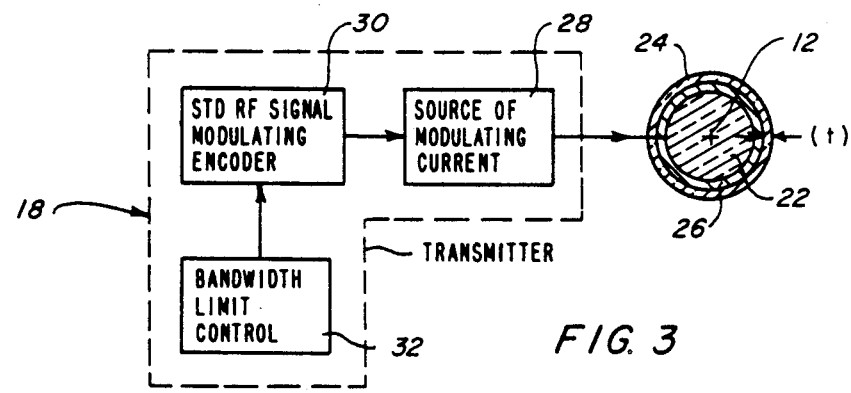
FIG. 3
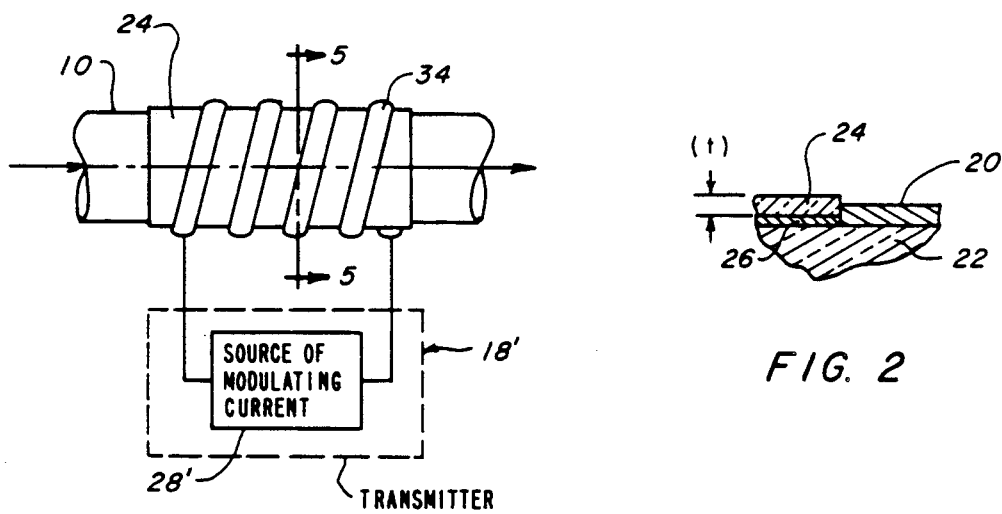
FIG. 2
FIG. 4
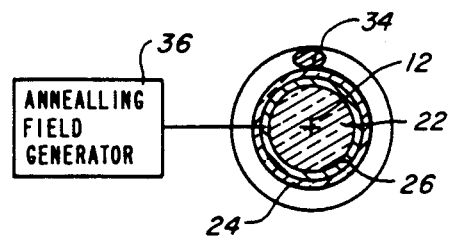
FIG. 5

LASER COMMUNICATION SYSTEM WITH WIDE BAND MAGNETOSTRICTIVE MODULATION

BACKGROUND OF THE INVENTION

This invention relates generally to phase modulation of a laser beam signal carrier conducted through an optical fiber cable, and is related to the disclosure in my prior copending application, U.S. Ser. No. 715,786, filed Mar. 25, 1985, now replaced by continuation application, Ser. No. 436,935 filed Nov. 13, 1989 and the disclosures in U.S. Ser. No. 613,835, filed May 24, 1984, (now U.S. Pat. No. 4,763,030 to Clark et al. issued Aug. 9, 1988) and its parent application, U.S. Ser. No. 438,211, filed Nov. 1, 1982, (abandoned), the present application being a continuation-in-part of all of the foregoing applications because of portions of the disclosures therein in common representing my innovative contributions.

It is generally well known that optical fibers are capable of transmitting information of significantly higher density than electrical conductors because of the high frequency monochromatic beam of coherent light (laser beam) conducted therethrough as the signal carrier. Such high information density transmission has heretofore been limited, as a practical matter, by a relatively narrow bandwidth of the encoding device operatively connected to the laser beam modulator.

Modulation of a laser beam conducted through an optical fiber cable was explicitly proposed for encoded signal generating purposes in my prior copending application, Ser. No. 715,786, aforementioned, while such purpose was inferentially referred to in U.S. Pat. No. 4,763,030 to Clark et al., aforementioned as well as in U.S. Pat. No. 4,433,291 to Yariv et al. According to the invention as claimed in my aforementioned prior copending application, Ser. No. 715,786, stimulated excitation energy is reflected within a resonance cavity formed between spaced end mirrors within an optical fiber core in order to effect analog frequency modulation of the laser beam carrier by magnetostrictive change in cavity dimension. Modulation encoding data was therefore applied magnetostrictively to the resonance cavity portion of the fiber cable through a conductive coating underlying the outer magnetostrictive sheathing.

According to the aforementioned patents to Clark et al. and Yariv et al., phase modulation of a laser beam carrier may be magnetostrictively effected by dimensional change in optical path length caused by strain along a core portion of the fiber cable merely covered by the outer magnetostrictive sheathing. The Clark et al. patent furthermore claims a particular metallic glass composition for the magnetostrictive sheathing that is rendered strain-free by magnetic annealing in order to enhance detection of the magnetic field being sensed as the paramount function of its magnetostrictive activity.

It is therefore an important object of the present invention to provide a system for more directly and economically modulating a laser beam signal carrier conducted through an optical fiber cable for high density data transmission of signals originating from an encoder having a relatively large bandwidth.

A further object in accordance with the foregoing object is to magnetostrictively modulate a laser beam conducted through an optical fiber cable by encoded control and application of a modulating magnetic field having certain beneficial relationships to the outer magnetostrictive sheathing that is annealed to enhance signal carrier modulation.

SUMMARY OF THE INVENTION

In accordance with the present invention, a standard RF encoder is connected to a source of current for generating a modulating magnetic field applied to an outer magnetostrictive sheathing covering the outer periphery of an optical fiber core along a modulating assembly portion of a fiber cable being dimensionally changed in path length to effect phase modulation of a laser beam signal carrier conducted through such fiber cable. The bandwidth for the encoder, which is the difference between limiting frequencies of its modulation frequency band, is preselected as an inverse function of the thickness of the magnetostrictive sheathing which is annealed in its assembled state to enhance the encoded modulating function associated therewith.

An electrically conductive coating underlies the magnetostrictive sheathing. In one preferred embodiment of the invention, a magnetic field generating current is supplied to such underlying conductive coating to perform the signal modulating function, while annealing is effected by an externally applied magnetic field. In another embodiment, the magnetic field for annealing purposes is generated internally of the assembly through the underlay coating while the modulation is effected by a magnetic field externally applied by means of a coil mounted on the magnetostrictive sheathing.

BRIEF DESCRIPTION OF THE DRAWINGS

A more complete understanding of the invention and many of the attendant advantages thereto will be readily appreciated as the same becomes better understood by reference to the following detailed description when considered in connection with the accompanying figures wherein:

FIG. 1 is a schematic illustration of a laser beam communication system in accordance with the present invention, showing in side elevation a signal modulating assembly portion of the associated optical fiber cable.

FIG. 2 is an enlarged partial section view taken substantially through a plane indicated by section line 2—2 in FIG. 1.

FIG. 3 is a transverse section view taken substantially through a plane indicated by section line 3—3 in FIG. 1, together with a more detailed schematic illustration of the phase modulating transmitter depicted in FIG. 1 in accordance with a preferred embodiment of the invention.

FIG. 4 is a side elevation view of a signal modulating portion of an optical fiber cable in accordance with another embodiment of the invention, with a schematic illustration of the phase modulating transmitter associated therewith.

FIG. 5 is a transverse section view taken substantially through a plane indicated by section line 5—5 in FIG. 4 with associated annealing means schematically depicted.

DETAILED DESCRIPTION OF PREFERRED EMBODIMENTS

Referring now to the drawings in detail, FIG. 1 schematically illustrates an elongated optical fiber cable, generally referred to by reference numeral 10 constituting a transmitting medium through which an optical path is established parallel to the fiber cable axis 12. Examples of such laser transmitting arrangements are disclosed in my aforementioned prior application Ser. No. 715,786, with respect to which the present application is a continuation-in-part. Laser beam radiation from a source 14 is thereby conducted by the fiber cable 10 to a receiver 16 for signal communication purposes. Toward that end, the laser beam radiation is phase modulated by a transmitter 18 along a limited modulating assembly portion of the fiber cable 10, intermediate the laser beam source 14 and receiver 16, as diagrammed in FIG. 1.

The modulating assembly portion of the optical fiber core 22, with which transmitter 18 is associated as shown in FIGS. 1 and 2, has a section of its usual outer peripheral coating 20 replaced by an outer magnetostrictive sheathing 24 and an underlying coating 26. The magnetostrictive sheathing 24 covering the outer periphery of its supporting portion of the fiber cable core 22 is preferably made of a metallic glass composition as disclosed in the Clark et al patent aforementioned, the disclosure of which is incorporated herein by reference. The underlying coating 26 on the other hand is an electrically conductive layer of copper gold or silver which may be deposited on the outer periphery of core 22 by magnetron sputtering, for example. An important aspect of the invention resides in the magnetostrictive sheathing 24 being relatively thin, having a thickness (t) as denoted in FIG. 1.

Another important aspect of the invention involves annealing of the outer sheathing 24 in its assembled state on the supporting portion of the fiber core 22 to remove mechanical strains therefrom tending to detract from those strains imposed by the magnetostrictive activity of the outer sheathing 24 in response to a magnetic field applied by the transmitter 18 for encoded signal transmission purposes. Annealing of the assembly may be performed by applying a magnetic annealing field thereto as disclosed in the aforementioned Clark et al. patent.

According to one embodiment of the invention depicted in FIG. 3, the transmitter 18 includes a source of current 28 producing the modulating magnetic field, such current source 28 being connected to the electrically conductive coating 26 through which the magnetic field is generated to render the magnetostrictive sheathing 24 operative to dimensionally change the optical path through the fiber core 22 at some modulating frequency. Toward that end, a standard RF signal encoder 30 may be connected to the source of current 28 as diagrammed in FIG. 3. In accordance with the present invention, operation of encoder 30 is limited to a bandwidth preselected by control 32, so as to be an inverse function of the thickness (t) of the magnetostrictive sheathing 24.

In the foregoing embodiment of the invention, the aforementioned annealing step was effected by application of a magnetic field to the modulating assembly orientated along the axis 12 of the fiber core 22, at an elevated temperature typically between 350° C. and 425° C. Subsequent phase modulation of the laser beam conducted along the path of fiber cable 10 by transmitter 18 is achieved by its encoded modulating magnetic field being imposed through the underlayer coating 26 in perpendicular relation to the aforementioned annealing magnetic field to enhance the magnetostrictive activity involved.

FIG. 4 depicts another embodiment of the invention wherein the encoded modulating magnetic field is externally applied to the modulating assembly portion of fiber core 22 including the outer sheathing 24 and underlayer coating 26, through a coil 34 mounted on the outer sheathing. The coil 34 thus produces a magnetic field oriented generally parallel to the axis 12 of the fiber cable In such case, the coil 34 is connected to a source of modulating current 28' of a transmitter 18' generally similar in arrangement and operation to transmitter 18 depicted in FIG. 3. Prior annealing of the modulating assembly portion underlying coil 34 is effected by means of an annealing magnetic field produced by current conducted through the underlying coating 26 to which an annealing field generator 36 is connected as depicted in FIG. 5.

Based on the foregoing described arrangements, signal encoding is simplified by use of standard RF equipment in semiconductor chip form for the encoder 30. By limiting the magnetostrictive sheathing 24 to a thickness (t) of minimum dimension sufficient to exert enough stress on the fiber core 22 to change its optical path length by a measurable amount, a correspondingly large transmission bandwidth, in excess of 1000 MHz, is made possible because of the inverse relationship between the thickness (t) of sheathing 24 and the preselected encoder bandwidth as aforementioned.

Obviously, numerous modifications and variations of the present invention are possible in light of the above teachings It is therefore to be understood that within the scope of the appended claims the invention may be practiced otherwise than as specifically described hrein.

What is claimed is:

1. In combination with apparatus for modulation of laser beam radiation conducted along an optical path extending through a transmitting medium having an outer periphery, means for applying a magnetic field to the medium along a portion of said optical path and magnetostrictive means covering the outer periphery of the medium along said portion of the optical path for dimensionally changing the medium, the improvement residing in signal encoding means operatively connected to the magnetic field applying means for controllably modulating the magnetic field within a modulation bandwidth defined between limiting frequencies of a preselected band, said magnetostrictive means comprising a sheathing having a thickness that is an inverse function of said modulation bandwidth enabling bandwidth enlargement by thickness reduction of the magnetostrictive means.

2. The improvement as defined in claim 1 wherein said means for applying the magnetic field includes a conductive layer underlying the magnetostrictive means, said signal encoding means being connected to the underlying conductive layer.

3. The combination of claim 2 wherein said magnetostrictive sheathing is made of metallic glass and said transmitting medium is an optical fiber cable.

4. The improvement as defined in claim 1 wherein said means for applying the magnetic field includes a field generating coil mounted externally on said magnetostrictive sheathing.

5. The combination of claim 4 including an electrically conductive layer covering the outer periphery of the medium underlying said magnetostrictive sheathing and means connected to said conductive layer for annealing the magnetostrictive sheathing.

6. The combination of claim 1 including an electrically conductive layer covering the outer periphery of the medium underlying said magnetostrictive sheathing.

7. In combination with apparatus for modulation of a laser beam signal carrier conducted along an optical path extending through a transmitting medium having an outer periphery and a magnetostrictive sheathing covering said outer periphery along said portion of the optical path, electrically conductive means underlying said magnetostrictive sheathing for applying a magnetic field thereto to dimensionally change the optical path, and signal encoding means connected to the electrically conductive means for modulating the magnetic field within a preselected bandwidth.

8. The combination of claim 7 wherein said magnetostrictive sheathing has a thickness that is inversely related in width to the preselected bandwidth enabling enlargement thereof by thickness reduction of said sheathing.

9. In combination with apparatus for modulation of a laser beam signal carrier along an optical path extending through a transmitting medium having an outer periphery, means for applying a magnetic field to the medium along a portion of said optical path and magnetostrictive means covering the outer periphery of the medium along said portion of the optical path for dimensionally changing the medium, the improvement residing in signal encoding means operatively connected to the magnetic field applying means for controllably modulating the magnetic field and means for annealing the magnetostrictive means prior to said application of the magnetic field to enhance said modulation of the laser beam signal carrier in response to said dimensional change in the optical path.

10. The combination of claim 9 wherein said annealing means includes an electrically conductive layer underlying the magnetostrictive means and a source of field generating current connected to said conductive layer.

11. In combination with apparatus for modulation of a laser beam signal carrier conducted along an optical path extending through a transmitting medium having an outer periphery and a magnetostrictive sheathing surrounding said outer periphery along a portion of the optical path, electrically conductive means applying a magnetic field to the sheathing for dimensionally changing the optical path and signal encoding means connected to the electrically conductive means for modulation of the magnetic field at modulating frequencies within a frequency band having limiting frequencies between which a preselected bandwidth is defined.

12. The combination of claim 11 wherein the difference between the limiting frequencies of the frequency band defining said preselected bandwidth is inversely related to thickness of the magnetostrictive sheathing enabling bandwidth enlargement by thickness reduction of the sheathing.

* * * * *